US009172572B2

(12) United States Patent
Yun et al.

(10) Patent No.: US 9,172,572 B2
(45) Date of Patent: Oct. 27, 2015

(54) DIGITAL VIDEO BROADCASTING-CABLE SYSTEM AND METHOD FOR PROCESSING RESERVED TONE

(75) Inventors: Sung Ryul Yun, Suwon-si (KR); Hak Ju Lee, Incheon (KR); Jae Yoel Kim, Suwon-si (KR); Yeon Ju Lim, Seoul (KR); Se Ho Myung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1022 days.

(21) Appl. No.: 12/694,801

(22) Filed: Jan. 27, 2010

(65) Prior Publication Data

US 2010/0195758 A1 Aug. 5, 2010

(30) Foreign Application Priority Data

Jan. 30, 2009 (KR) ........................ 10-2009-0007203
Mar. 16, 2009 (KR) ........................ 10-2009-0022376

(51) Int. Cl.
*H04K 1/10* (2006.01)
*H04L 27/26* (2006.01)
(Continued)

(52) U.S. Cl.
CPC .......... *H04L 27/2618* (2013.01); *H04L 5/0044* (2013.01); *H04H 20/78* (2013.01)

(58) Field of Classification Search
CPC ..... H04L 27/2618; H04L 27/06; H04L 27/00; H04L 27/2647; H04L 5/0007; H04L 27/2657; H04L 27/2662; H04L 5/0048; H04H 20/78
USPC .................................. 375/260, 259, 316, 295
See application file for complete search history.

(56) References Cited

U.S. PATENT DOCUMENTS 8,300,714 B2 10/2012 Yun et al.
2005/0100108 A1 5/2005 Yun et al.
(Continued)

FOREIGN PATENT DOCUMENTS

CN 1404309 3/2003
EP 2 153 600 1/2012
(Continued)

OTHER PUBLICATIONS

Digital Video Broadcasting (DVB); Frame Structure Channel Coding and Modulation for a Second Generation Digital Transmission System for Cable Systems (DVB-C2), XP-002549974, DVB Document A138, Apr. 30, 2009.
(Continued)

*Primary Examiner* — Zewdu Kassa
(74) *Attorney, Agent, or Firm* — The Farrell Law Firm, P.C.

(57) ABSTRACT

A Digital Video Broadcasting-Cable (DVB-C) system and a processing method for reserved tones are provided. A transmitter determines a position of broadcast data and a position of reserved tones in a frame and sends a broadcast signal into which the broadcast data and the reserved tones are inserted. A receiver determines the position of reserved tones in a received broadcast signal and extracts broadcast data from the broadcast signal in consideration of the determined position of the reserved tones. The system and method may compensate for the peak power of broadcast data to be transmitted through a multi-channel bundle, by inserting reserved tones into the whole multi-channel bundle with combined channel bands. This may reduce the Peak to Average Power Ratio (PAPR) of broadcast signals in the DVB-C system and thereby improve the performance of the DVB-C system while still adopting Orthogonal Frequency Division Multiplexing (OFDM).

12 Claims, 6 Drawing Sheets

(51) Int. Cl.
*H04L 5/00* (2006.01)
*H04H 20/78* (2008.01)

(56) References Cited

U.S. PATENT DOCUMENTS

| | | | |
|---|---|---|---|
| 2007/0237068 A1 | 10/2007 | Bi et al. | |
| 2008/0298490 A1* | 12/2008 | Yun et al. | 375/260 |
| 2009/0185648 A1* | 7/2009 | Gau | 375/346 |
| 2010/0080113 A1* | 4/2010 | Yang et al. | 370/210 |

FOREIGN PATENT DOCUMENTS

| | | |
|---|---|---|
| JP | 2003-258761 | 9/2003 |
| JP | 2004-153811 | 5/2004 |
| JP | 2007-504748 | 3/2007 |
| KR | 1020080106834 | 12/2008 |
| RU | 2282888 | 8/2006 |
| TW | 276317 | 3/2007 |
| TW | 278601 | 4/2007 |
| TW | 279997 | 4/2007 |
| TW | 283114 | 6/2007 |
| WO | WO 99/01956 | 1/1999 |
| WO | WO 03/027876 | 4/2003 |
| WO | WO 2004/039011 | 5/2004 |
| WO | WO 2006/048203 | 5/2006 |
| WO | WO 2007/091434 | 8/2007 |

OTHER PUBLICATIONS

Digital Video Broadcasting (DVB); Frame Structure Channel Coding and Modulation for a Second Generation Digital Transmission System for Cable Systems (DVB-C2), [Part <n>: Part element of title; [Sub-part <m>: Sub-part element of title]], Draft ETSI EN 302 xxx v0.3.2, Dec. 2008.

DVB Organization: "DVB_TM_C2_197_draft_en_302xxxv010101rev3.2.doc", Digital Video Broadcasting, Jan. 8, 2009.

European Search Report dated Jul. 10, 2015 issued in counterpart application No. 15157245.0-1505.

* cited by examiner

DIGITAL VIDEO BROADCASTING-CABLE SYSTEM AND METHOD FOR PROCESSING RESERVED TONE

PRIORITY

This application claims priority to and the benefit of Korean Patent Application Nos. 10-2009-007203 and 10-2009-0022376 filed in the Korean Intellectual Property Office on Jan. 30, 2009 and Mar. 16, 2009, respectively, the entire contents of which are incorporated herein by reference.

BACKGROUND OF THE INVENTION

1. Field of the Invention

The present invention generally relates to communications technology and, more particularly, to a Digital Video Broadcasting Cable (DVB-C) system based on Orthogonal Frequency Division Multiplexing (OFDM) and a method for processing a reserved tone therein.

2. Description of the Related Art

Current communication systems offer various enhanced communication services with high-rate data transmissions and improved Quality of Service (QoS). Some of these current communication systems are based on OFDM.

OFDM is a multi-carrier technique that allows data transmission through a number of subcarriers disposed to maintain orthogonality amongst the subcarriers. OFDM typically has a higher efficiency of frequency use than various other multiplexing schemes and is tolerant of multi-path fading. Therefore, OFDM has been widely adopted in standards of mass communication systems such as the Digital Audio Broadcasting (DAB) system and the Digital Video Broadcasting—Terrestrial (DVB-T) system. The DVB-T system uses a single channel band to offer a broadcasting service.

However, a traditional Digital Video Broadcasting—Cable (DVB-C) system was based on a single-carrier technique that allows data transmission through a single subcarrier. Contrary to the DVB-T system, the DVB-C system uses a number of channel bands to offer a broadcasting service, and thus DVB-C has a higher efficiency of frequency use. In the DVB-C system, channel bands are organized in a simple link structure as shown in FIG. 1. Therefore, as the number of channel bands increases, guard bands located at both sides of each individual channel band also increase in number. For example, if four channel bands are employed in the DVB-C system, a bandwidth actually available for a broadcasting service is limited to the sum of four channel bands excluding the eight guard bands.

In view of the above-described bandwidth limitation, a DVB-C second generation (DVB-C2) system not only employs at least one channel band to offer a broadcasting service, but also is based on OFDM. In the DVB-C2 system, channel bands combine into a multi-channel bundle as shown in FIG. 2. Therefore, even when the number of channel bands increases, the number of guard bands does not change. For example, when four channel bands are used according to the DVB-C2 system illustration of FIG. 2, a bandwidth actually available for a broadcasting service excludes only two guard bands. Therefore, the DVB-C2 system may have better frequency efficiency than the traditional DVB-C system or the DVB-T system.

However, the DVB-C2 system may have shortcomings in that a Peak to Average Power Ratio (PAPR) is relatively higher than the other systems, due to the adoption of OFDM. Specifically, since the amplitude of a broadcast signal based on OFDM is equal to the sum of the amplitudes of subcarriers, such a broadcast signal may be inherently subjected to a significant fluctuation in amplitude. Additionally, this amplitude fluctuation may become significant when the phases of subcarriers coincide with each other. Therefore, the performance of the DVB-C2 system may be deteriorated by the amplitude fluctuations.

BRIEF SUMMARY OF THE INVENTION

Accordingly, an object of the present invention is to address the above-mentioned problems and/or disadvantages and to provide at least the advantages described below.

According to one aspect of the present invention, a method for receiving a broadcast signal is provided. The method includes when the broadcast signal is received in a frame that includes a plurality of combined bands divided along a frequency domain, determining a position of reserved tones in each combined band of the frame; and extracting broadcast data from the broadcast signal in consideration of the determined position of the reserved tones.

According to another aspect of the present invention, a method for transmitting a broadcast signal is provided. The method includes determining a position of reserved tones in each combined band of a frame that includes the combined bands divided along a frequency domain; and inserting the reserved tones and broadcast data into the broadcast signal in consideration of the determined position of the reserved tones.

According to still another aspect of the present invention, a receiver for a broadcast signal is provided. The receiver includes a position determining unit configured to determine a position of reserved tones in each combined band of a frame when the broadcast signal is received in the frame that includes the combined bands divided along a frequency domain; and a broadcast data processing unit configured to extract broadcast data from the broadcast signal in consideration of the determined position of the reserved tones.

According to yet another aspect of the present invention, a transmitter for a broadcast signal is provided. The transmitter includes a symbol builder configured to determine a position of reserved tones in each combined band of a frame that includes the combined bands divided along a frequency domain; and a broadcast signal generating unit configured to insert the reserved tones and broadcast data into the broadcast signal in consideration of the determined position of the reserved tones.

Aspects of the present invention may allow inserting reserved tones into an entire multi-channel bundle composed of combined channel bands, thereby being able to compensate for peak power of broadcast data to be transmitted through the multi-channel bundle. This may allow a reduction in a PAPR of broadcast signals in the DVB-C system. Therefore, aspects of the present invention may improve the performance of the DVB-C system by reducing the PAPR of broadcast signals while still adopting OFDM.

BRIEF DESCRIPTION OF THE DRAWINGS

Other aspects, advantages, and salient features of the invention will become apparent to those skilled in the art from the following detailed description, which, taken in conjunction with the annexed drawings, discloses embodiments of the invention.

DETAILED DESCRIPTION OF EMBODIMENTS OF THE INVENTION

Non-limiting embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Well-known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Figure 1:
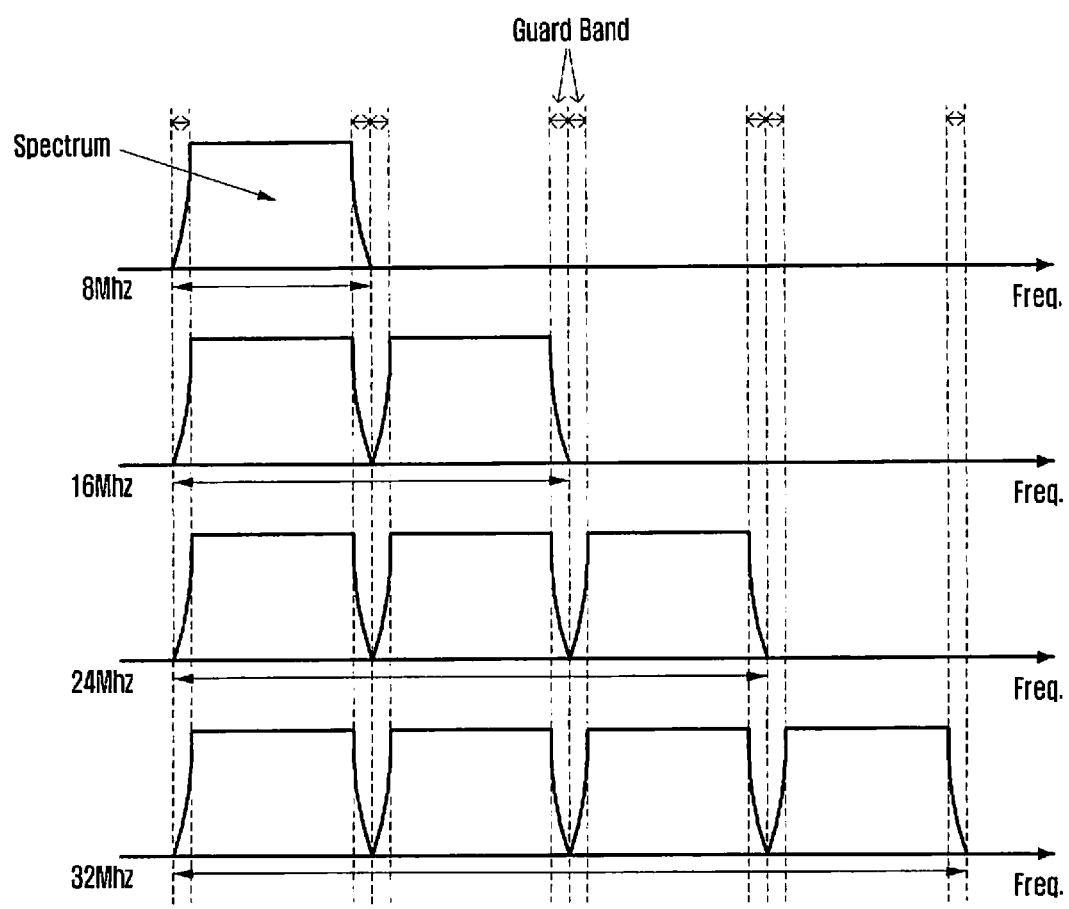
FIG. 1 is a diagram illustrating an example of channel bands used in a conventional DVB-C system.
Figure 2:
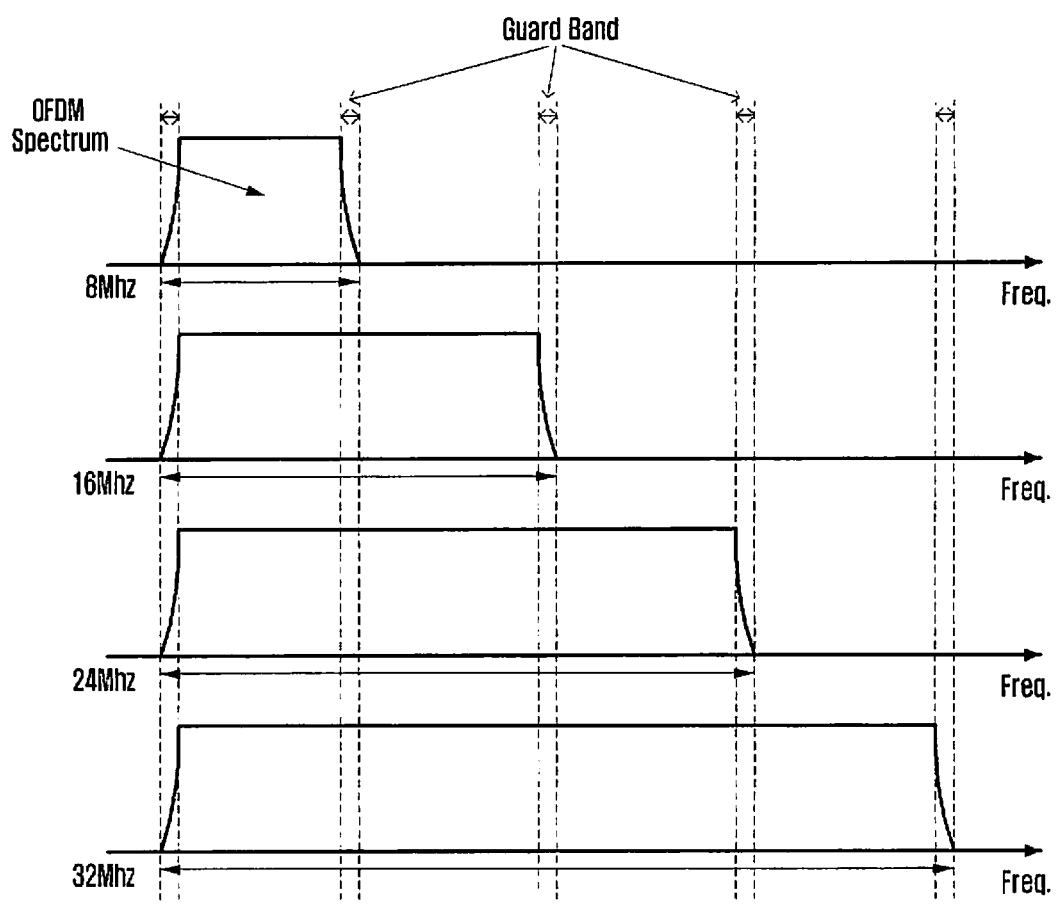
FIG. 2 is a diagram illustrating an example of channel bands used in a DVB-C system in accordance with an embodiment of the present invention.

A Digital Video Broadcasting—Cable (DVB-C) system according to embodiments of the present invention is configured to provide a broadcasting service. The DVB-C system according to embodiments of the present invention is the DVB-C second generation (DVB-C2) system, which offers a broadcasting service through a multi-channel bundle composed of at least one channel band, normally composed of several channel bands, as shown in FIG. 2. Such a DVB-C system has a transmitter and a receiver. The transmitter is configured to create and transmit a broadcast signal having broadcast data. The receiver is configured to receive a broadcast signal and is further configured to process broadcast data in the received broadcast signal. In this manner, the DVB-C system allows users to access a broadcasting service.

Particularly, the DVB-C system according to embodiments of this invention offers a broadcasting service based on OFDM, while reducing PAPR through a Tone Reservation scheme. DVB-C systems and methods for processing a reserved tone in accordance with embodiments of this invention may allow insertion of reserved tones into the whole multi-channel bundle with channel bands combined, thereby enabling compensation for the peak power of broadcast data to be transmitted through a multi-channel bundle. This enablement may further allow a favorable reduction in the PAPR of a broadcast signal in the DVB-C system. Therefore, the present invention may improve the performance of the DVB-C system through a reduced PAPR while still adopting OFDM.

Additionally, in order to maintain commonality with the DVB-T system, the DVB-C system may use the same standard as the DVB-T system uses. For instance, with the DVB-T system, the DVB-C system may use a channel band of 8 MHz and also use 4K Fast Fourier Transform (FFT) as units of modulation and demodulation in OFDM parameter. By combining N channel bands, the DVB-C system may use a multi-channel bundle that has a size of N times 8 MHz and a modulation/demodulation unit of $2^{N+1}$K FFT. Here, the DVB-C system may combine up to thirty-two channel bands. Described hereinafter is a case where each channel band is formed of 3,408 subcarriers. However, it will be understood by those skilled in the art that the present invention is not limited to the following case example.

Figure 3:
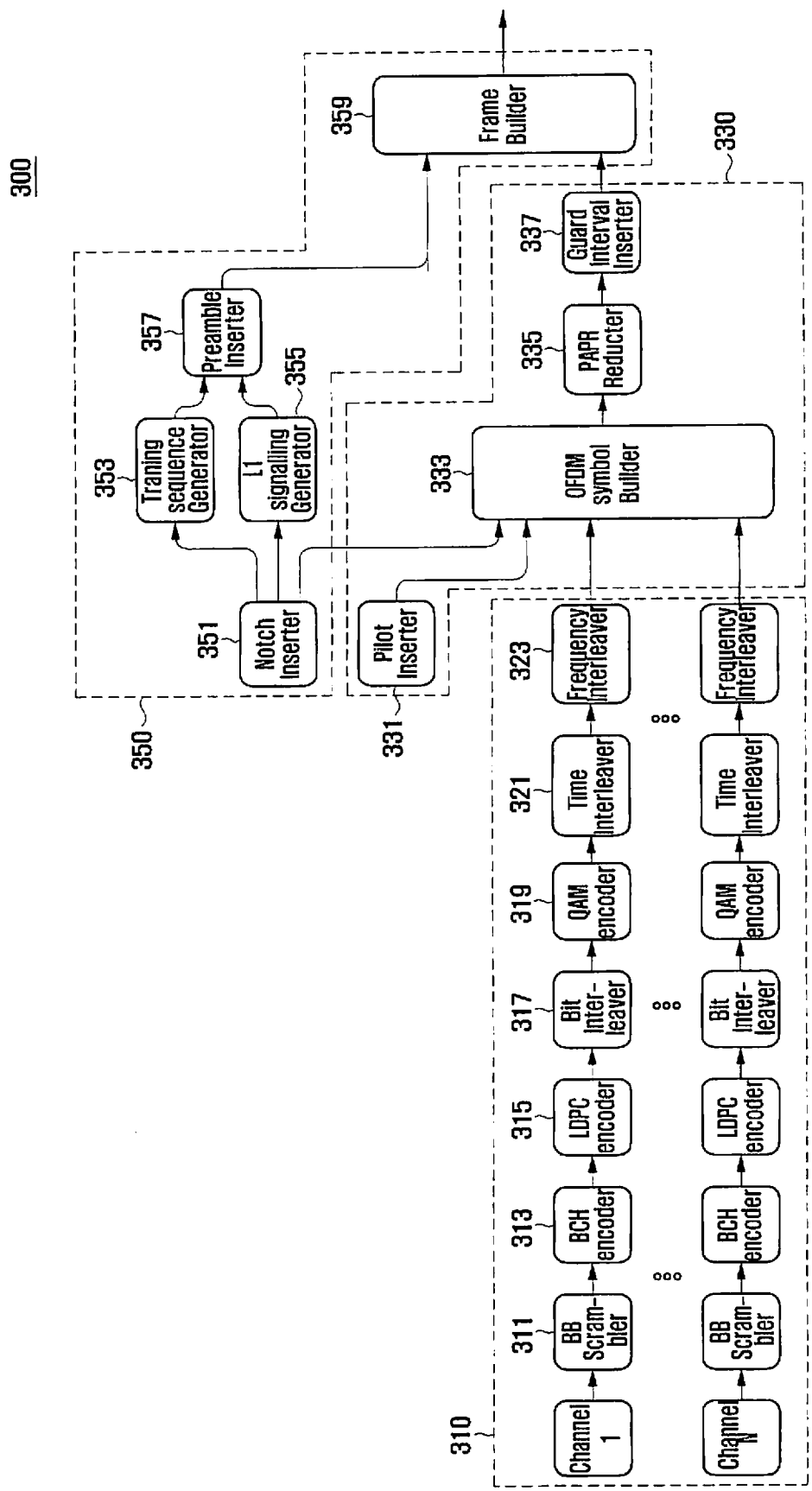
FIG. 3 is a block diagram illustrating a configuration of a transmitter in a DVB-C system in accordance with an embodiment of the present invention.

A configuration of a transmitter in the DVB-C system is described as follows with reference to FIG. 3. FIG. 3 is a block diagram illustrating a configuration of a transmitter in a DVB-C system in accordance with an embodiment of the present invention.

Referring to FIG. 3, a transmitter 300 according to an embodiment of the present invention includes a plurality of broadcast data generating units 310, a broadcast signal generating unit 330, and a frame organizing unit 350.

The number of the broadcast data generating units 310 corresponds to that of channel bands in a symbol. Each of the broadcast data generating units 310 is configured to produce, using an input signal, broadcast data to be transmitted through each channel band. Specifically, within each broadcast data generating unit 310, a base band (BB) scrambler 331 scrambles an input signal to a specific frequency band. Then a Bose, Chaudhuri, Hocquenghem (BCH) encoder 313 encodes an input signal into a BCH code, and a Low Density Parity Check (LDPC) encoder 315 encodes an input signal into an LDPC code. A bit interleaver 317 and a Quadrature Amplitude Modulation (QAM) encoder 319 also produce a constellation signal based on a complex number from an input signal. Then, a time interleaver 321 interleaves an input signal in a time domain, and a frequency interleaver 323 interleaves an input signal into a frequency domain.

The broadcast signal generating unit 330 is configured to produce a broadcast signal using broadcast data. The broadcast signal generating unit 330 creates a broadcast signal, depending on a multi-channel bundle with channel bands combined. Specifically, in the broadcast signal generating unit 330, an OFDM symbol builder 333 combines broadcast data in the respective channel bands and forms a symbol for each channel band. The OFDM symbol builder 333 determines the position of pilots, the position of broadcast data and the position of reserved tones, within each channel band. At this time, the OFDM symbol builder 333 uses an index of each subcarrier to determine the positions. The OFDM symbol builder 333 may also include a memory unit (not illustrated). After determining the positions, the OFDM symbol builder 333 inserts pilots, produced in a pilot inserter 331, and inserts broadcast data, produced in the broadcast data generating units 310, into their determined positions, respectively, and performs an Inverse Fast Fourier Transform (IFFT). Additionally, a PAPR reducer 335 inserts reserved tones for reducing the PAPR of broadcast data into their determined positions. Then a guard interval inserter 337 inserts a guard band into both sides of a multi-channel bundle.

The frame organizing unit 350 is configured to form a frame with a multi-channel bundle. Specifically, in the frame organizing unit 350, a notch inserter 351 inserts a notch into the frame. A training sequence generator 353 and an L1 signaling generator 355 add a training sequence and an L1 signal to the frame, respectively. After the training sequence and the L1 signal are added to the frame, a preamble inserter 357 inserts a preamble into the frame, and a frame builder 359 determines the frame with the preamble, the multi-channel bundle, etc.

Figure 4:
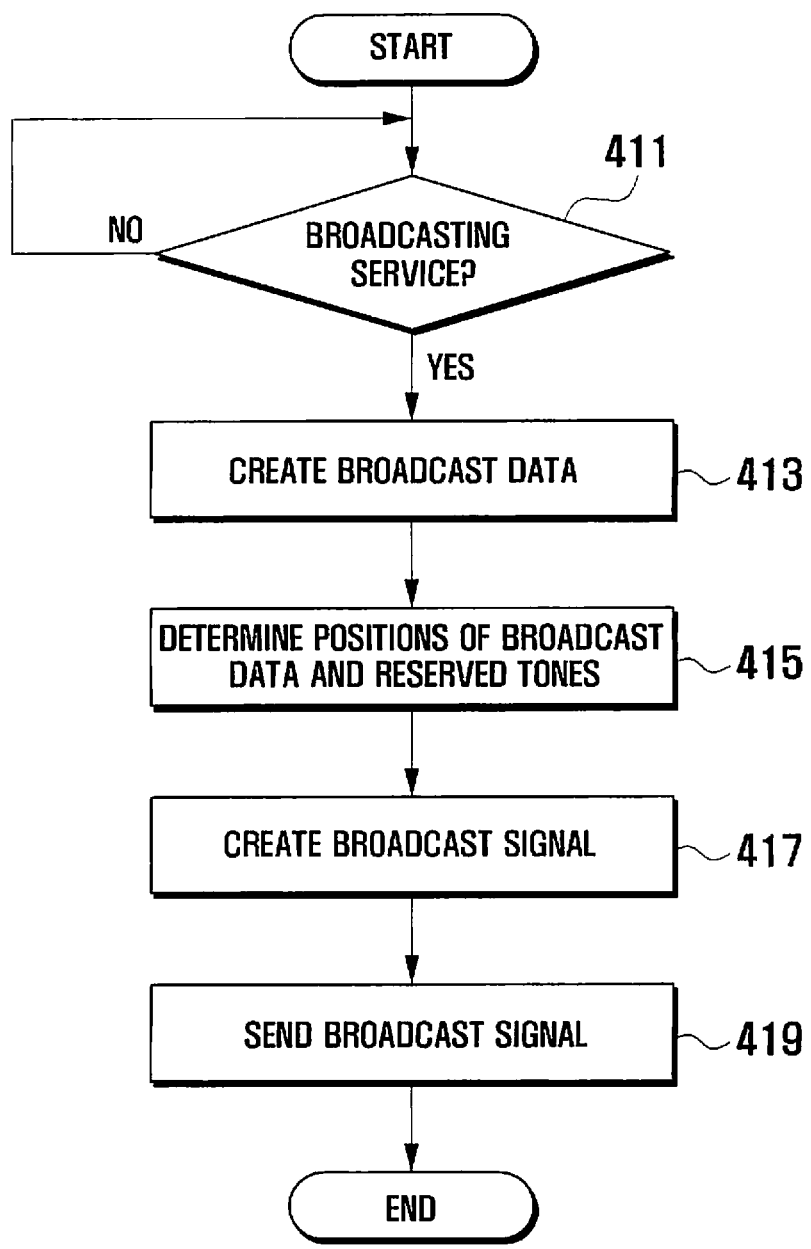
FIG. 4 is a flow diagram illustrating a method for processing a reserved tone in a transmitter of a DVB-C system in accordance with an embodiment of the present invention.

A method for processing a reserved tone when the aforesaid transmitter sends a broadcast signal according to an embodiment of the present invention is described with reference to FIG. 4. FIG. 4 is a flow diagram illustrating a method for processing a reserved tone in a transmitter of a DVB-C system in accordance with an embodiment of the present invention. In this embodiment, such a method for processing a reserved tone in a transmitter is performed according to frames.

Referring to FIG. 4, the transmitter 300 determines whether a broadcasting service is to be offered, in step 411. If the broadcasting service will be offered, the transmitter 300 creates broadcast data, in step 413. Particularly, in step 413, the transmitter 300 produces broadcast data of a multi-channel bundle from input signals. More specifically, the transmitter 300 creates broadcast data by channel bands and then combines them.

In step 415, the transmitter 300 determines the position of broadcast data and the position of reserved tones. The positions are determined for each channel band. Here, the transmitter 300 determines such positions so that any of pilots, broadcast data, and reserved tones will not conflict with each other in any of the subcarriers arranged in each channel band. More specifically, there may be more than one way of determining the position of reserved tones. The transmitter 300 may determine the position of broadcast data and the position of reserved tones in consideration of the number of subcarriers by sizes of a predefined initial channel band.

One way of determining the position of reserved tones is to use a shift value between channel bands of a multi-channel bundle. In each symbol, the forefront channel band will be referred to as an initial channel band, and at least one channel band following the initial channel band will be referred to as a subsequent channel band.

The transmitter 300 determines the position of broadcast data and the position of reserved tones in the initial channel band. Specifically, the transmitter 300 scatters pilots over the initial channel band and thereby determines their position. Then the transmitter 300 determines the position of reserved tones in consideration of a distance between pilots. The position of reserved tones should not coincide with the positions of pilots. The transmitter 300 also determines the position of broadcast data at positions other than the position of pilots and the position of reserved tones. In the initial channel band, the position of reserved tones may be determined through the following Equation (1). Alternatively, the position of reserved tones in the initial channel band may be predetermined and stored in a memory unit as shown in the following Table 1.

$$S_l = \{i_h + D_X \times (b \bmod D_Y) | i_n \in S_0, 0 \le n < N_{RT}, N_{P2} \le l < N_{P2} + L_{normal}\} \quad \text{Equation (1)}$$

'S' represents a combination of the positions of reserved tones. An index of a symbol is denoted by 'l', and an index of a reserved tone is denoted by 'i'. $D_X$ represents a frequency gap between pilots, and $D_Y$ represents a symbol gap between pilots. $N_{RT}$ represents the number of reserved tones, $N_{P2}$ represents the number of P2 symbols in a frame, and $L_{normal}$ represents the number of all symbols excluding the P2 symbols.

TABLE 1

| Size of Initial Channel Band (Number of Reserved Tones) | Position Combination of Reserved Tones |
| --- | --- |
| 1K (10) | {109, 117, 122, 129, 139, 321, 350, 403, 459, 465} |
| 2K (18) | {250, 404, 638, 677, 700, 712, 755, 952, 1125, 1145, 1190, 1276, 1325, 1335, 1406, 1431, 1472, 1481} |
| 4K (36) | {170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119} |
| 8K (72) | {111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565} |
| 16K (144) | {109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409} |
| 32K (288) | {164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, |

TABLE 1-continued

Size of Initial Channel
Band (Number of
Reserved Tones)    Position Combination of Reserved Tones 5104, 5106, 5111, 5131, 5145, 5146, 5177, 5181, 5246, 5269,
5458, 5474, 5500, 5509, 5579, 5810, 5823, 6058, 6066, 6098,
6411, 6741, 6775, 6932, 7103, 7258, 7303, 7413, 7586, 7591,
7634, 7636, 7655, 7671, 7675, 7756, 7760, 7826, 7931, 7937,
7951, 8017, 8061, 8071, 8117, 8317, 8321, 8353, 8806, 9010,
9237, 9427, 9453, 9469, 9525, 9558, 9574, 9584, 9820, 9973,
10011, 10043, 10064, 10066, 10081, 10136, 10193, 10249,
10511, 10537, 11083, 11350, 11369, 11428, 11622, 11720,
11924, 11974, 11979, 12944, 12945, 13009, 13070, 13110,
13257, 13364, 13370, 13449, 13503, 13514, 13520, 13583,
13593, 13708, 13925, 14192, 14228, 14235, 14279, 14284,
14370, 14393, 14407, 14422, 14471, 14494, 14536, 14617,
14829, 14915, 15094, 15138, 15155, 15170, 15260, 15283,
15435, 15594, 15634, 15810, 16178, 16192, 16196, 16297,
16366, 16498, 16501, 16861, 16966, 17039, 17057, 17240,
17523, 17767, 18094, 18130, 18218, 18344, 18374, 18657,
18679, 18746, 18772, 18779, 18786, 18874, 18884, 18955,
19143, 19497, 19534, 19679, 19729, 19738, 19751, 19910,
19913, 20144, 20188, 20194, 20359, 20490, 20500, 20555,
20594, 20633, 20656, 21099, 21115, 21597, 22139, 22208,
22244, 22530, 22547, 22562, 22567, 22696, 22757, 22798,
22854, 22877, 23068, 23102, 23141, 23154, 23170, 23202,
23368, 23864, 24057, 24215, 24219, 24257, 24271, 24325,
24447, 25137, 25590, 25702, 25706, 25744, 25763, 25811,
25842, 25853, 25954, 26079, 26158, 26285, 26346, 26488,
26598, 26812, 26845, 26852, 26869, 26898, 26909, 26927,
26931, 26946, 26975, 26991, 27039}

In step 415, the transmitter 300 determines the position of broadcast data and the position of reserved tones in a subsequent channel band by calculating a shift value from the initial channel band to the subsequent channel band. A shift value may correspond to n-times the size of the initial channel band wherein 'n' is integer. Specifically, the transmitter 300 shifts the position of each reserved tone in the initial channel band by a shift value and therefore determines the position in the subsequent channel band. The position of reserved tones in the subsequent channel band may be determined through the following Equation (2).

$$S_l^{ch} = \{i_k + D_X \times (l \bmod D_Y) + (ch-1)N_{FFT} | i_n \in S_0, 0 \leq n < N_{RT}, N_{P2} \leq l < N_{P2} + L_{normal}, 1 \leq ch < N_{ch}\}$$ Equation (2)

An index of a channel band in a symbol is denoted by ch. Also, $N_{FFT}$ represents the size of the initial channel band, and $N_{ch}$ represents the number of channel bands.

For example, when the position combination of reserved tones in the initial channel band is denoted by $S^1$ and the size of the initial channel band is denoted by 4K, a combination of the positions of reserved tones in a symbol may be determined as shown in the following Table 2. In this example, a multi-channel bundle in a symbol is composed of the initial channel band and three subsequent channel bands.

TABLE 2

| Channel Band | Position Combination of Reserved Tones |
|---|---|
| Initial Channel Band | $S^1$ |
| 1st Subsequent Channel Band | $S^2 = S^1 + 4K$ |
| 2nd Subsequent Channel Band | $S^3 = S^1 + 8K$ |
| 3rd Subsequent Channel Band | $S^4 = S^1 + 16K$ |

Therefore, the transmitter 300 may determine the position of broadcast data and the position of reserved tones in a multi-channel bundle of a symbol with the initial channel band and subsequent channel band combined. At this time, in step 415, the position of reserved tones in a multi-channel bundle may be determined through the following Equation (3).

$$S_l^{Bundle} = \sum_{Ch=1}^{N_{ch}} S_l^{ch}$$ Equation (3)

However, a second way of determining the position of reserved tones includes using the size of a multi-channel bundle. In each symbol, the foremost channel band will be referred to as an initial channel band, and at least one channel band following the initial channel band will be referred to as a subsequent channel band.

According to the second example of a process for determining the position of reserved tones, the transmitter 300 determines the position of broadcast data and the position of reserved tones in the initial channel band. Specifically, the transmitter 300 scatters pilots over the initial channel band and thereby determines the positions of the pilots. Then the transmitter 300 determines the position of reserved tones in consideration of a distance between pilots. The position of reserved tones should not coincide with that of pilots. Also, the transmitter 300 determines the position of broadcast data at positions other than the position of pilots and the position of reserved tones.

While maintaining the position of broadcast data and the position of reserved tones in the initial channel band, the transmitter 300 determines such positions in the subsequent channel band. Specifically, the transmitter 300 scatters pilots over the subsequent channel band and thereby determines the positions of the scattered pilots. Then the transmitter 300 determines the position of reserved tones in consideration of a distance between pilots. The position of reserved tones should not coincide with the position of the pilots. The transmitter 300 also determines the position of broadcast data at positions other than the position of pilots and the position of reserved tones. In the initial channel band, the position of reserved tones may be determined and stored in a memory unit as shown in the following Table 3. Furthermore, the position of reserved tones in each of the initial channel band and the subsequent channel band of a symbol may be determined through the following Equation (4).

TABLE 3

| Size of Initial Channel Band (Number of Reserved Tones) | Position Combination of Reserved Tones |
| --- | --- |
| 1K (10) | S(1K) = {140, 142, 199, 262, 265, 431, 482, 502, 524, 557} |
| 2K (19) | S(1K) + S(2K), <br> S(2K) = {773, 997, 1003, 1015, 1063, 1233, 1447, 1534} |
| 4K (37) | S(1K) + S(2K) + S(4K), <br> S(4K) = {1867, 2149, 2179, 2213, 2242, 2401, 2414, 2492, 2522, 2564, 2589, 2630, 2881, 2937, 3063, 3067, 3113, 3207} |
| 8K (73) | S(1K) + S(2K) + S(4K) + S(8K), <br> S(8K) = {3508, 3627, 3821, 3842, 3862, 4052, 4143, 4198, 4253, 4478, 4567, 4711, 4826, 4937, 5035, 5077, 5179, 5275, 5314, 5500, 5531, 5613, 5726, 5818, 5841, 5891, 5935, 6118, 6265, 6398, 6428, 6429, 6641, 6683, 6698, 6701} |
| 16K (145) | S(1K) + S(2K) + S(4K) + S(8K) + S(16K), <br> S(16K) = {8389, 8441, 8525, 8581, 8605, 8722, 8966, 8975, 9003, 9005, 9034, 9163, 9225, 9259, 9461, 9622, 9682, 9813, 9911, 9932, 9938, 10043, 10084, 10180, 10364, 10503, 10623, 10778, 10798, 10894, 10949, 11021, 11061, 11157, 11233, 11254, 11375, 11387, 11427, 11482, 11745, 11746, 11798, 12287, 12299, 12308, 12329, 12445, 12449, 12461, 12483, 12490, 12501, 12518, 12783, 12838, 12874, 12890, 12937, 13009, 13103, 13147, 13229, 13239, 13317, 13375, 13401, 13435, 13486, 13490, 13497, 13509} |
| 32K (289) | S(1K) + S(2K) + S(4K) + S(8K) + S(16K) + S(32K), <br> S(32K) = {13891, 13900, 13987, 13988, 14093, 14103, 14636, 14721, 14734, 14821, 15045, 15686, 15794, 16015, 16139, 16335, 16342, 16349, 16473, 16483, 16508, 16515, 16516, 16555, 16633, 16646, 16829, 17029, 17092, 17492, 17500, 17509, 17557, 17597, 17654, 17687, 17692, 17709, 17732, 17961, 18083, 18109, 18188, 18434, 18740, 18770, 18837, 18916, 18922, 18951, 19067, 19155, 19425, 19457, 19483, 19573, 19579, 19589, 19665, 19802, 19937, 20149, 20182, 20233, 20445, 20618, 20663, 20865, 20966, 21019, 21261, 21310, 21419, 21481, 21585, 21661, 21761, 21789, 21855, 22094, 22286, 22294, 22705, 22729, 22786, 23073, 23083, 23126, 23133, 23158, 23482, 23539, 23750, 23881, 23894, 23903, 24063, 24101, 24133, 24399, 24407, 24410, 24634, 24663, 25054, 25281, 25306, 25331, 25363, 25415, 25510, 25670, 25730, 25809, 25835, 25852, 25870, 25891, 25915, 26222, 26252, 26258, 26282, 26295, 26315, 26342, 26404, 26417, 26500, 26613, 26690, 26698, 26761, 26765, 26770, 26774, 26780, 26890, 26954, 26962, 26972, 27014, 27037, 27122} |

$$S_l^{ch} = \{i_k + D_X \times (l \bmod D_Y) | i_n \in S_0^{ch}, 0 \le n < N_{RT}, N_{P2} \le l < N_{P2} + L_{normal}, 1 \le ch \le N_{ch}\} \quad \text{Equation (4)}$$

In Equation (4), $N_{ch}$ represents the number of channel bands.

For example, when the combination of positions of reserved tones in the initial channel band is denoted by $S^1$ and the size of the initial channel band is denoted by 4K, the combination of positions of reserved tones in a symbol may be determined as shown in the following Table 4. According to the example of Table 4, a multi-channel bundle in a symbol is composed of the initial channel band and three subsequent channel bands.

TABLE 4

| Channel Band | Position Combination of Reserved Tones |
| --- | --- |
| Initial Channel Band | $S^1$ = S(1K) + S(2K) + S(4K) |
| 1st Subsequent Channel Band | $S^2$ = S(8K) |
| 2nd Subsequent Channel Band | $S^3$ = S(16K) |
| 3rd Subsequent Channel Band | $S^4$ = S(32K) |
| Multi-channel Bundle | $S^{Bundle}$ = S(1K) + S(2K) + S(4K) + S(8K) + S(16K) + S(32K) |

Therefore, the transmitter 300 may determine the position of broadcast data and the position of reserved tones in a multi-channel bundle with the initial channel band and the subsequent channel band combined. More specifically, the transmitter 300 determines the position of reserved tones in a predefined manner. At this time, in step 415, the position of reserved tones in a multi-channel bundle may be determined through the following Equation (5).

$$S_t^{Bundle} = \sum_{ch=1}^{N_{ch}} S_t^{ch} \quad \text{Equation (5)}$$

According to another example of the second way of determining the position of the reserved tones, the transmitter 300 determines the position of broadcast data and the position of reserved tones in the initial channel band. Specifically, the transmitter 300 scatters pilots over the initial channel band and thereby determines the positions of the scatter pilots. Then the transmitter 300 determines the position of reserved tones in consideration of a distance between pilots. Here, the position of reserved tones should not coincide with that of pilots. The transmitter 300 also determines the position of broadcast data at positions other than the position of pilots and the position of reserved tones.

Additionally, while maintaining the position of broadcast data and the position of reserved tones in the initial channel band, the transmitter 300 determines such positions in the subsequent channel band. More specifically, the transmitter 300 scatters pilots over the subsequent channel band and thereby determines their position. Then the transmitter 300 determines the position of reserved tones in consideration of a distance between pilots. The position of reserved tones should not coincide with that of pilots. The transmitter 300 also determines the position of broadcast data at places other than the position of pilots and the position of reserved tones.

Meanwhile, a symbol is composed of several combined bands each of which has at least one channel band. For example, a symbol may include four combined bands. In this case, the position of reserved tones in combined bands at the forefront portion of a symbol may be determined and stored in a memory unit as shown in the following Table 5. Furthermore, each combined band may be formed from eight channel bands. In this case, the position of reserved tones in combined bands at the forefront portion of a symbol may be determined and stored in a memory unit as shown in the following Table 6, but not limited thereto. Additionally, the position of reserved tones in each of the initial channel band and the subsequent channel band of a symbol may be determined through the following Equation (6).

TABLE 5

Position Combination of Reserved Tones 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255, 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711, 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123, 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520, 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912, 17150, 17285, 17387, 17488, 17533, 17603, 17708, 17793, 17932, 18026, 18081, 18159, 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315, 20559, 20703, 20737, 20876, 20950, 21069, 21106, 21231, 21323, 21379, 21494, 21611, 21680, 21796, 21805, 21958, 22027, 22091, 22167, 22324, 22347, 22459, 22551, 22691, 22761, 22822, 22951, 22981, 23089, 23216, 23290, 23402, 23453, 23529, 23668, 23743, 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123

TABLE 6

| Index of Channel Band | Set | Position Combination of Reserved Tones |
|---|---|---|
| 1 | $T_1$ | 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255 |
| 2 | $T_2$ | 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711 |
| 3 | $T_3$ | 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123 |
| 4 | $T_4$ | 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520 |
| 5 | $T_5$ | 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912 |
| 6 | $T_6$ | 17150, 17285, 17387, 17488, 17533, 17603, 17708, 17793, 17932, 18026, 18081, 18159, 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315 |
| 7 | $T_7$ | 20559, 20703, 20737, 20876, 20950, 21069, 21106, 21231, 21323, 21379, 21494, 21611, 21680, 21796, 21805, 21958, 22027, 22091, 22167, 22324, 22347, 22459, 22551, 22691, 22761, 22822, 22951, 22981, 23089, 23216, 23290, 23402, 23453, 23529, 23668, 23743 |
| 8 | $T_8$ | 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123 |

$$S_l = \{i_n + D_X \times (l \bmod D_Y) | i_n \in S_0, 0 \le n < N_{RT}\},$$
$$m \le l < c2\_frame\_length - m \quad \text{Equation (6)}$$

In Equation (6), c2_frame_length represents the number of all symbols in a frame of the DVB-C system.

Therefore, the transmitter 300 may determine the position of broadcast data and the position of reserved tones in a multi-channel bundle with the initial channel band and the subsequent channel band combined, thereby determining the position of reserved tones in a predefined manner. Depending on the number of channel bands in a multi-channel bundle, in step 415, the position of reserved tones in a multi-channel bundle may be determined through the following Equation (7).

$$S_0 = \bigcup_{ck=1}^{NUM\_BUNDLED\_CH} T_{ck} \quad \text{Equation (7)}$$

Here, NUM_BUNDLED_CH represents the number of channel bands in a multi-channel bundle. In addition, $T_{ch}$ represents a set, namely, the position combination of reserved tones by channel bands in a symbol, and U represents the union of sets by channel bands in a symbol.

For example, if there are two channel bands in a multi-channel bundle based on a condition of including the initial channel band of a specific symbol, the total position combination of reserved tones in a multi-channel bundle may be formed of the combination of positions of reserved tones corresponding to sets of $T_1$ and $T_2$. Otherwise, if there are four channel bands in the multi-channel bundle based on the condition of including the initial channel band of a specific symbol, the total position combination of reserved tones in a multi-channel bundle may be formed according to the combination of positions of reserved tones corresponding to sets of $T_1$, $T_2$, $T_3$ and $T_4$.

When the number of channel bands including the initial channel band in a symbol is extended beyond a predefined number, e.g., eight, the position of reserved tones by channel bands in a symbol may be determined according to the following Equation (8). The position of reserved tones in a symbol may be determined by repetition of sets from $T_1$ to $T_8$ at intervals of 3408×8 subcarriers.

$$T_{8(i-1)+j} = ((t+3408\times 8(i-1)) | \forall t \in T_j), i=1,2,3,4, j=1,2,\ldots,8 \quad \text{Equation (8)}$$

An index of a combined band formed of eight channel bands in a symbol is denoted by 'i', and an index of a channel band in each combined band is denoted by 'j'.

The transmitter 300 may determine the position of reserved tones by repeating the reserved tones in every combined band, namely, at intervals of eight channel bands in a symbol. The position of reserved tones in each combined band may be determined according to Table 6. By using the stored position of reserved tones as shown in Table 6 and a distance between combined bands, the position of reserved tones in each channel band in a frame may be determined. The position of reserved tones in each combined band may also be determined so that the position may comply with conditions determined through the following Equation (9). The transmitter 300 may determine the position of reserved tones so that each combined band may have an identical arrangement of reserved tones.

$$[k \bmod (8 \cdot K_{L1})] - D_X(l \bmod D_Y) \in S_0, 0 \leq l < L_{DATA} \quad \text{Equation (9)}$$

An index of a subcarrier in a symbol is denoted by 'k'. Also, $L_{DATA}$ represents the number of data symbols in a frame, $K_{L1}$ represents the number of subcarriers by channel bands, and $S_0$ represents the position combination of reserved tones determined as shown in the above Table 6.

Meanwhile, the DVB-C system may often allot a part of bands for other uses. Generally this allocation of a part of bands refers to a notch. A subcarrier to which a notch is allotted should not send any signals including data, pilots, reserved tones, etc. Therefore, reserved tones located between subcarriers at the beginning and end of a notch are excluded from performing a reduction in PAPR.

Although, in the above Table 6, the classification of cells by channel bands is made on the assumption that channel bands in a symbol are divided by 4K FFT as units of modulation and demodulation, the present invention is not limited to this case. Alternatively, if channel bands in a symbol are divided by 8K FFT, cells by channel bands may be classified into $T_1+T_2$, $T_3+T_4$, $T_5+T_6$, and $T_7+T_8$.

After determining the position of broadcast data and the position of reserved tones as fully discussed hereinbefore, the transmitter 300 creates a broadcast signal corresponding to a multi-channel bundle, in step S417. In step 417, the transmitter 300 inserts broadcast data and reserved tones in each channel band. Therefore, the PAPR of broadcast data is reduced by reserved tones.

Then the transmitter 300 sends a broadcast signal in step S419. Therefore, the transmitter 300 provides a broadcasting service.

Figure 5:
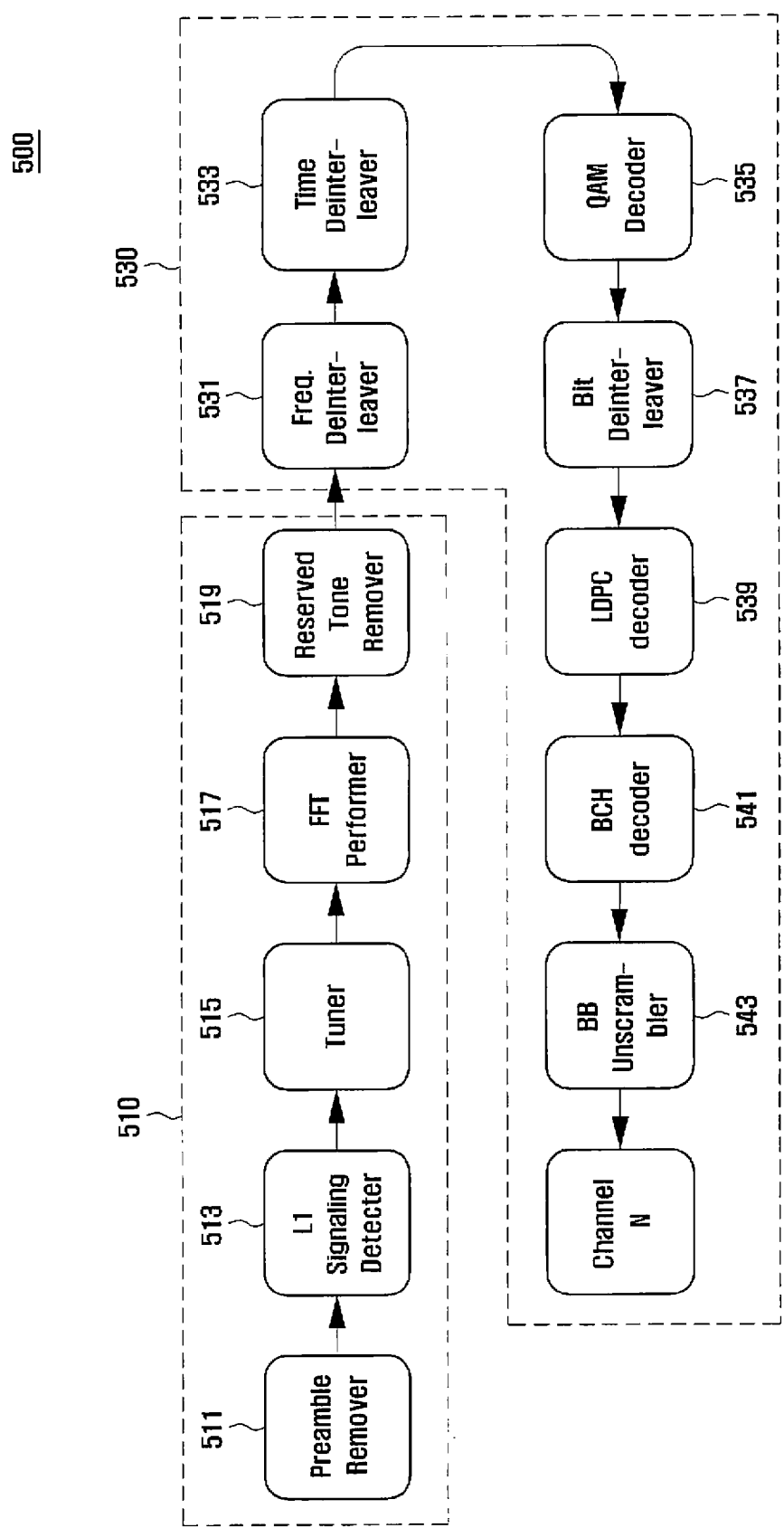
FIG. 5 is a block diagram illustrating a configuration of a receiver in a DVB-C system in accordance with an embodiment of the present invention.
Figure 6:
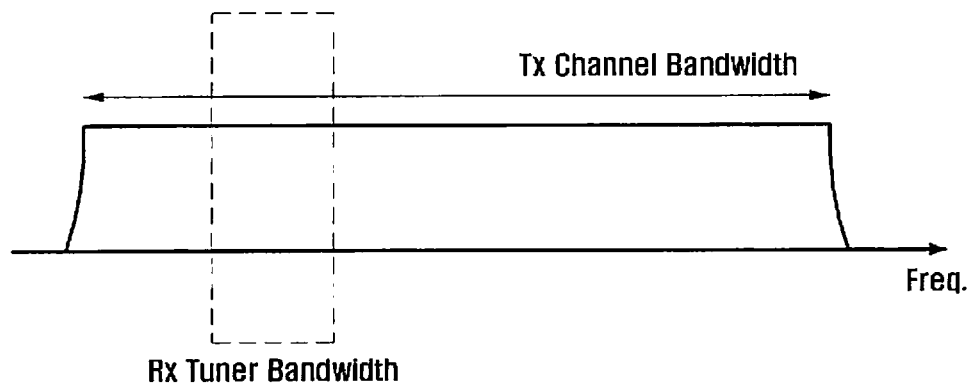
FIG. 6 is a view illustrating an operation example of the receiver shown in FIG. 5.

A configuration of a receiver in the DVB-C system is described as follows with reference to FIG. 5. FIG. 5 is a block diagram illustrating a configuration of a receiver in a DVB-C system in accordance with an embodiment of the present invention. Also, FIG. 6 is illustrates an operation example of the receiver of FIG. 5.

Referring to FIG. 5, the receiver 500 includes a broadcast signal processing unit 510 and a broadcast data processing unit 530.

The broadcast signal processing unit 510 is configured to extract a broadcast signal from a multi-channel bundle by frames. Specifically, in the broadcast signal processing unit 510, a preamble remover 511 sets a sync of a frame. An L1 signaling detector 513 detects an L1 signal, and a tuner 515 receives a broadcast signal through a specific frequency bandwidth (Rx tuner bandwidth) allotted to the receiver 500 as shown in FIG. 6. The broadcast signal processing unit 510 extracts a broadcast signal from a part of a multi-channel bundle (Tx channel bandwidth). In addition, a Fast Fourier Transform (FFT) performer 517 performs FFT, and a reserved tone remover 519 determines the position of reserved tones in a broadcast signal and removes reserved tones from the determined position. The reserved tone remover 519 may include a memory unit (not illustrated) and a position determining unit (not illustrated). The memory unit may store the position of reserved tones in combined bands at the forefront portion of a symbol according to the aforesaid Tables 5 and 6. The position determining unit may determine the position of reserved tones in a multi-channel bundle by using the stored position in the memory unit. Then, by removing reserved tones from a multi-channel bundle, the reserved tone remover 519 can extract broadcast data from a broadcast signal.

The broadcast data processing unit 530 is configured to process broadcast data remaining after reserved tones are removed from a broadcast signal. Specifically, in the broadcast data processing unit 530, a frequency deinterleaver 531 and a time deinterleaver 533 perform deinterleaving of broadcast data in the time domain and the frequency domains, respectively. Then a QAM decoder 535 and a bit deinterleaver 537 produce an output signal from broadcast data. An LDPC decoder 539 decodes an LDPC code, and a BCH decoder 541 decodes a BCH code. Finally, a BaseBand (BB) unscrambler 543 regulates an output signal.

Figure 7:
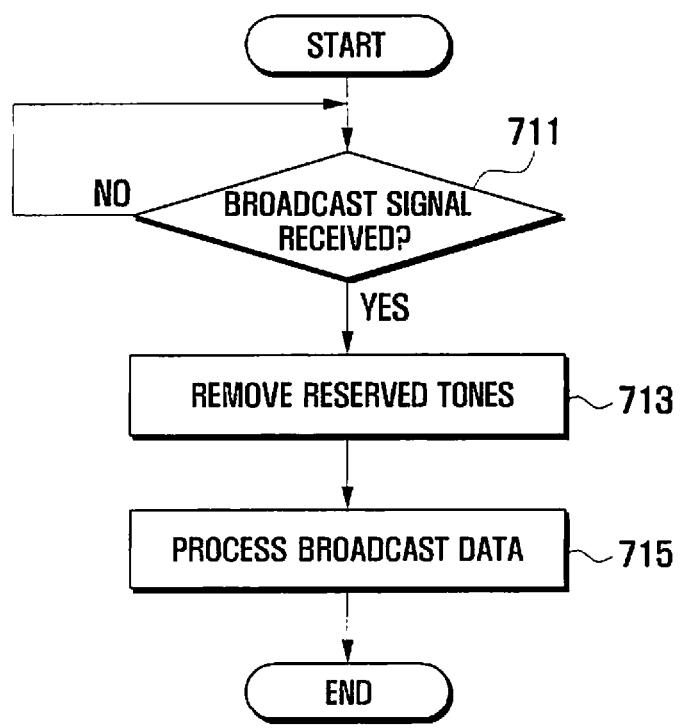
FIG. 7 is a flow diagram illustrating a method for processing a reserved tone in a receiver of a DVB-C system in accordance with an embodiment of the present invention.

A method for processing a reserved tone when the aforesaid receiver receives a broadcast signal is described as follows with reference to FIG. 7. FIG. 7 is a flow diagram that illustrates a method for processing a reserved tone in a receiver of a DVB-C system in accordance with an embodiment of the present invention. In the embodiment according to FIG. 7, such a method for processing a reserved tone in a receiver is performed according to frames.

Referring to FIG. 7, the receiver 500 detects the reception of a broadcast signal in step 711. Then the receiver 500 removes reserved tones from a broadcast signal in step 713. In step 713, the receiver 500 ascertains the position of broadcast data and the position of reserved tones in a broadcast signal in an allocated frequency band by using the position of pilots. Here, the receiver 500 may determine the position of reserved tones in the same manner as the transmitter 300. Accordingly, a description of a determining the position of the reserved tones, by the receiver 500, is omitted herein. The receiver 500 determines the position of reserved tones in a predefined manner, and then removes reserved tones from a broadcast signal.

For example, the receiver 500 may determine the position of reserved tones in a frame by using the combination of positions of reserved tones stored in advance as shown in Tables 5 or 6. The receiver 500 may determine the position of channel bands corresponding to a multi-channel bundle allotted to the receiver 500 in combined bands. Then, the receiver 500 may determine the position of reserved tones in a multi-channel bundle by using the position of channel bands in a frame and the position of reserved tones stored as shown in the aforesaid Table 5.

In step 715, the receiver 500 performs processing of broadcast data. In this step 715, the receiver 500 processes broadcast data to produce an output signal, thereby enabling users to enjoy a broadcasting service.

Although in the above-described embodiments of both a transmitter and a receiver of the DVB-C system according to the present invention employ a predefined manner of determining the position of reserved tones in a multi-channel bundle, above-described embodiments are not to be considered as a limitation of the present invention. In alternative embodiments, the transmitter and the receiver may store in advance the position of reserved tones, depending on the number of channel bands used to form a multi-channel bundle. The transmitter and the receiver may use the previously stored position of reserved tones.

As fully discussed hereinbefore, the DVB-C system and the processing method for reserved tones according to embodiments of the present invention may compensate for the peak power of broadcast data to be transmitted through a multi-channel bundle, by inserting reserved tones into the whole multi-channel bundle composed of combined channel bands. This processing system and method may allow a reduction in the PAPR of broadcast signals in the DVB-C system. It is therefore possible not only to still adopt OFDM in the DVB-C system, but also to improve the performance of the DVB-C system by reducing the PAPR of broadcast signals.

While the present invention has been shown and described with reference to embodiments thereof, it will be understood by those skilled in the art that various changes in form and details may be made therein without departing from the spirit and scope of the invention as defined by the appended claims.

What is claimed is:

1. A method for receiving a signal, the method comprising:
if the signal is received in a frame that includes a plurality of combined bands divided along a frequency domain, determining a position of reserved tones; and
extracting data from the signal in consideration of the determined position of the reserved tones,
wherein the position of the reserved tones includes the index combination of carriers according to a table:

| Position Combination of Reserved Tones |
| --- |
| 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255, 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711, 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123, 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520, 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912, 17150, 17285, 17387, 17488, 17533, 17603, 17708, 17793, 17932, 18026, 18081, 18159, |

-continued

| Position Combination of Reserved Tones |
| --- |
| 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315, 20559, 20703, 20737, 20876, 20950, 21069, 21106, 21231, 21323, 21379, 21494, 21611, 21680, 21796, 21805, 21958, 22027, 22091, 22167, 22324, 22347, 22459, 22551, 22691, 22761, 22822, 22951, 22981, 23089, 23216, 23290, 23402, 23453, 23529, 23668, 23743, 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123. |

2. A method for receiving a signal, the method comprising:
if the signal is received in a frame that includes a plurality of combined bands divided along a frequency domain, determining a position of reserved tones; and
extracting data from the signal in consideration of the determined position of the reserved tones,
wherein the position of the reserved tones in each combined band is determined so that the position complies with conditions determined through an equation:

$$[k \bmod (8 \cdot K_{L1})] - D_X(l \bmod D_Y) \epsilon S_0, 0 \leq l < L_{DATA},$$

where 'k' represents an index of a carrier, $K_{L1}$ represents a number of carriers by frequency band, $D_X$ represents a frequency gap between pilots in the frame, T represents an index of a symbol in the frame, $D_Y$ represents a symbol gap between the pilots in the frame, $L_{DATA}$ represents a number of data symbols in the frame, and $S_0$ represents the position of the reserved tones.

3. The method of claim 2, wherein each of the combined bands is divided into eight channel bands along the frequency domain and each of the channel bands is formed of 3,408 carriers.

4. A method for transmitting a signal, the method comprising:
determining a position of reserved tones of each of frequency bands of a frame that includes a plurality of the combined bands divided along a frequency domain; and
inserting the reserved tones and data into the signal in consideration of the determined position of the reserved tones,
wherein the position of the reserved tones includes the index combination of carriers according to a table:

| Position Combination of Reserved Tones |
| --- |
| 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255, 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711, 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123, 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520, 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912, 17150, 17285, 17387, 17488, 17533, 17603, 17708, 17793, 17932, 18026, 18081, 18159, 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315, 20559, 20703, 20737, |

-continued

| Position Combination of Reserved Tones |
|---|
| 20876, 20950, 21069, 21106, 21231, 21323, 21379, 21494, 21611, 21680, 21796, 21805, 21958, 22027, 22091, 22167, 22324, 22347, 22459, 22551, 22691, 22761, 22822, 22951, 22981, 23089, 23216, 23290, 23402, 23453, 23529, 23668, 23743, 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123. |

5. A method for transmitting a signal, the method comprising:
determining a position of reserved tones of each of frequency bands of a frame that includes a plurality of the combined bands divided along a frequency domain; and
inserting the reserved tones and data into the signal in consideration of the determined position of the reserved tones,
wherein the position of the reserved tones of each of the frequency bands is determined so that the position complies with conditions determined through an equation:

$$[k \bmod (8 \cdot K_{L1})] - D_X(l \bmod D_Y) \in S_0, 0 \le l < L_{DATA},$$

where 'k' represents an index of a carrier, $K_{L1}$ represents a number of carriers by frequency band, $D_X$ represents a frequency gap between pilots in the frame, 'l' represents an index of a symbol in the frame, $D_Y$ represents a symbol gap between the pilots in the frame, $L_{DATA}$ represents a number of data symbols in the frame, and $S_0$ represents the position of the reserved tones.

6. The method of claim 5, wherein each of the combined bands is divided into eight channel bands along the frequency domain and each of the channel bands is formed of 3,408 carriers.

7. A receiver for a signal, the receiver comprising:
a position determining unit configured to determine, if the signal is received in a frame that includes a plurality of combined bands divided along a frequency domain, a position of reserved tones; and
a data processing unit configured to extract data from the signal in consideration of the determined position of the reserved tones,
wherein the position of the reserved tones includes the index combination of carriers according to a table:

| Position Combination of Reserved Tones |
|---|
| 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255, 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711, 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123, 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520, 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912, 17150, 17285, 17387, 17488, 17533, 17603, 17708, 17793, 17932, 18026, 18081, 18159, 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315, 20559, 20703, 20737, 20876, 20950, 21069, 21106, 21231, 21323, 21379, 21494, 21611, 21680, |

-continued

| Position Combination of Reserved Tones |
|---|
| 21796, 21805, 21958, 22027, 22091, 22167, 22324, 22347, 22459, 22551, 22691, 22761, 22822, 22951, 22981, 23089, 23216, 23290, 23402, 23453, 23529, 23668, 23743, 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123. |

8. A receiver for a signal, the receiver comprising:
a position determining unit configured to determine, if the signal is received in a frame that includes a plurality of combined bands divided along a frequency domain, a position of reserved tones; and
a data processing unit configured to extract data from the signal in consideration of the determined position of the reserved tones,
wherein the position of the reserved tones of each of the combined bands is determined so that the position complies with conditions determined through an equation:

$$[k \bmod (8 \cdot K_{L1})] - D_X(l \bmod D_Y) \in S_0, 0 \le l < L_{DATA},$$

where 'k' represents an index of a carrier, $K_{L1}$ represents a number of carriers by frequency band, $D_X$ represents a frequency gap between pilots in the frame, 'l' represents an index of a symbol in the frame, $D_Y$ represents a symbol gap between the pilots in the frame, $L_{DATA}$ represents a number of data symbols in the frame, and $S_0$ represents the position of the reserved tones.

9. The receiver of claim 8, wherein each of the combined bands is divided into eight channel bands along the frequency domain and each of the channel bands is formed of 3,408 carriers.

10. A transmitter for a signal, the transmitter comprising:
a symbol builder configured to determine a position of reserved tones of a frame that includes a plurality of the combined bands divided along a frequency domain; and
a signal generating unit configured to insert the reserved tones and data into the signal in consideration of the determined position of the reserved tones,
wherein the position of the reserved tones includes the index combination of carriers according to a table:

| Position Combination of Reserved Tones |
|---|
| 161, 243, 296, 405, 493, 584, 697, 741, 821, 934, 1021, 1160, 1215, 1312, 1417, 1462, 1591, 1693, 1729, 1845, 1910, 1982, 2127, 2170, 2339, 2365, 2499, 2529, 2639, 2745, 2864, 2950, 2992, 3119, 3235, 3255, 3559, 3620, 3754, 3835, 3943, 3975, 4061, 4210, 4270, 4371, 4417, 4502, 4640, 4677, 4822, 4904, 5026, 5113, 5173, 5271, 5317, 5426, 5492, 5583, 5740, 5757, 5839, 5935, 6033, 6146, 6212, 6369, 6454, 6557, 6597, 6711, 6983, 7047, 7173, 7202, 7310, 7421, 7451, 7579, 7666, 7785, 7831, 7981, 8060, 8128, 8251, 8326, 8369, 8445, 8569, 8638, 8761, 8873, 8923, 9017, 9104, 9239, 9283, 9368, 9500, 9586, 9683, 9782, 9794, 9908, 9989, 10123, 10327, 10442, 10535, 10658, 10739, 10803, 10925, 11006, 11060, 11198, 11225, 11326, 11474, 11554, 11663, 11723, 11810, 11902, 11987, 12027, 12117, 12261, 12320, 12419, 12532, 12646, 12676, 12808, 12915, 12941, 13067, 13113, 13246, 13360, 13426, 13520, 13811, 13862, 13936, 14073, 14102, 14206, 14305, 14408, 14527, 14555, 14650, 14755, 14816, 14951, 15031, 15107, 15226, 15326, 15392, 15484, 15553, 15623, 15734, 15872, 15943, 16043, 16087, 16201, 16299, 16355, 16444, 16514, 16635, 16723, 16802, 16912, 17150, 17285, 17387, 17488, 17533, 17603, 17708, 17793, 17932, 18026, 18081, 18159, 18285, 18356, 18395, 18532, 18644, 18697, 18761, 18874, 18937, 19107, 19119, 19251, 19379, 19414, 19522, 19619, 19691, 19748, 19875, 19935, 20065, 20109, 20261, 20315, 20559, 20703, 20737, 20876, 20950, 21069, 21106, 21231, 21323, 21379, 21494, 21611, 21680, 21796, 21805, 21958, 22027, 22091, 22167, 22324, 22347, 22459, 22551, 22691, 22761, 22822, 22951, 22981, 23089, 23216, 23290, 23402, 23453, |

| Position Combination of Reserved Tones |
|---|
| 23529, 23668, 23743, 24019, 24057, 24214, 24249, 24335, 24445, 24554, 24619, 24704, 24761, 24847, 24947, 25089, 25205, 25274, 25352, 25474, 25537, 25612, 25711, 25748, 25874, 25984, 26078, 26155, 26237, 26324, 26378, 26545, 26623, 26720, 26774, 26855, 26953, 27021, 27123. |

11. A transmitter for a signal, the transmitter comprising:
a symbol builder configured to determine a position of reserved tones of a frame that includes a plurality of the combined bands divided along a frequency domain; and
a signal generating unit configured to insert the reserved tones and data into the signal in consideration of the determined position of the reserved tones,
wherein the position of the reserved tones of each of the combined bands is determined so that the position complies with conditions determined through an equation:

$$[k \bmod (8 \cdot K_{L1})] - D_X(l \bmod D_Y) \in S_0, 0 \leq l < L_{DATA},$$

where 'k' represents an index of a carrier, $K_u$ represents a number of carriers by frequency band, $D_X$ represents a frequency gap between pilots in the frame, 'l' represents an index of a symbol in the frame, $D_Y$ represents a symbol gap between the pilots in the frame, $L_{DATA}$ represents a number of data symbols in the frame, and $S_0$ represents the position of the reserved tones.

12. The transmitter of claim 11, wherein each of the combined bands is divided into eight channel bands along the frequency domain and each of the channel bands is formed of 3,408 carriers.

* * * * *